United States Patent
Gonabal et al.

(10) Patent No.: US 12,417,191 B2
(45) Date of Patent: Sep. 16, 2025

(54) INTEGRATED KEY REVOCATION WITH A FIELD LOADING PROCESS AND/OR RELATED SAFETY CHECKS RELATED TO AN ASSET SYSTEM

(71) Applicant: Honeywell International Inc., Charlotte, NC (US)

(72) Inventors: Srinivas D. Gonabal, Bengaluru (IN); Thomas Snider, Glendale, AZ (US)

(73) Assignee: Honeywell International Inc., Charlotte, NC (US)

(*) Notice: Subject to any disclaimer, the term of this patent is extended or adjusted under 35 U.S.C. 154(b) by 351 days.

(21) Appl. No.: 18/055,609

(22) Filed: Nov. 15, 2022

(65) Prior Publication Data

US 2024/0160582 A1     May 16, 2024

(51) Int. Cl.
*G06F 12/14* (2006.01)
*H04L 9/08* (2006.01)

(52) U.S. Cl.
CPC ........ *G06F 12/1466* (2013.01); *H04L 9/0891* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 6,671,589 B2 | 12/2003 | Holst et al. | |
| 7,543,140 B2 | 6/2009 | Dillaway et al. | |
| 8,984,265 B2 | 3/2015 | Vaid et al. | |
| 9,059,854 B2 | 6/2015 | Smith et al. | |
| 9,270,469 B2 | 2/2016 | Moore et al. | |
| 9,479,332 B2 | 10/2016 | Ballesteros | |
| 9,798,887 B2 | 10/2017 | Keidar et al. | |
| 10,181,956 B2 | 1/2019 | Jeansonne et al. | |
| 10,742,421 B1 | 8/2020 | Wentz et al. | |
| 2005/0267860 A1 | 12/2005 | Benguigui | |
| 2009/0327741 A1 | 12/2009 | Zimmer et al. | |

(Continued)

OTHER PUBLICATIONS

Cisco, "Digitally Signed Cisco Software", retrieved from the Internet at URL: <https://www.cisco.com/c/en/us/td/docs/ios-xml/ios/sys-image-mgmt/configuration/xe-16-8/sysimgmgmt-xe-16-8-book/sysimgmgmt-dgtly-sgnd-sw.pdf> on Feb. 27, 2023, 14 pages.

(Continued)

*Primary Examiner* — Atta Khan
(74) *Attorney, Agent, or Firm* — Alston & Bird LLP (57) ABSTRACT

Various embodiments relate to integrated key revocation with a field loading process and/or related safety and security checks related to an asset system. In an implementation, a data loading request to store a data file via a target storage device of an asset is received. The data file can be signed based on a first key. In response to the data loading request, a key identifier for the first key associated with the data file is compared against (i) a list of key identifiers stored in a key revocation list and (ii) a one-time programmable (OTP) memory of the asset. Additionally, in response to a determination that the data file is successfully authenticated against the key revocation list and the OTP memory, a key revocation process is performed with respect to a second key for the data file associated with the data loading request.

20 Claims, 7 Drawing Sheets

(56) References Cited

U.S. PATENT DOCUMENTS

| | | | |
|---|---|---|---|
| 2011/0225409 A1* | 9/2011 | Sibert | G06F 21/575 |
| | | | 713/2 |
| 2014/0331064 A1* | 11/2014 | Ballesteros | G06F 12/1408 |
| | | | 713/193 |
| 2017/0180139 A1* | 6/2017 | Jeansonne | H04L 9/3236 |
| 2017/0359171 A1 | 12/2017 | Haridas et al. | |
| 2020/0257801 A1 | 8/2020 | Khoruzhenko et al. | |
| 2024/0152620 A1* | 5/2024 | Marando | G06F 21/602 |

OTHER PUBLICATIONS

Véronique Cortier et al., "Revoke and Let Live: A Secure Key Revocation API for Cryptographic Devices," CCS '12: Proceedings of the 2012 ACM conference on Computer and communications security, 918-928, (2012).

* cited by examiner

INTEGRATED KEY REVOCATION WITH A FIELD LOADING PROCESS AND/OR RELATED SAFETY CHECKS RELATED TO AN ASSET SYSTEM

TECHNICAL FIELD

The present disclosure generally relates to the digital security of an asset system, and more particularly to methods and systems for safely and securely revoking keys associated with various data files and software applications associated with said asset system.

BACKGROUND

Security of digital assets is becoming increasingly important due to the growing amount of various network connectivity services being provided for digital assets. For example, a digital asset is often vulnerable to a cyber-attack such as a denial-of-service attack or another type of cyber-attack that can decrease performance of the digital asset and/or can result in altered functionality for the digital asset. However, Applicant has discovered various technical problems associated with conventional security techniques related to digital assets. Through applied effort, ingenuity, and innovation, Applicant has solved many of these identified problems by developing a solution that is embodied by the present invention, which is described in detail below.

BRIEF DESCRIPTIONS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

Security of digital assets is becoming increasingly important due to the growing amount of various network connectivity services being provided for digital assets. For example, a digital asset is often vulnerable to a cyber-attack such as a denial-of-service attack or another type of cyber-attack that can decrease performance of the digital asset and/or can result in altered functionality for the digital asset.

In order to enhance security of a digital asset, processors of a digital asset can provide a secure boot and/or can employ one or more cryptographic functions that can be deployed via various security applications. Many security applications employ conventional security techniques such as use of a public key infrastructure (PKI) service for digital signing and/or authenticating binary data files. For example, a PKI service generally employs asymmetric key pairs comprised of a public key and a private key. A private key is generally employed to digitally sign various data files and a public key is generally employed to verify authenticity of the data files. However, protection of a private key is generally directly related to a degree of security of a digital asset. For example, a digital asset can become unsecure and even unusable if a private key is identified by an untrusted source. Additionally, revoking and resetting public keys can be a timely and costly endeavor, which can lead to decreased performance for the digital asset.

In many cases, one or more hashed key identifiers associated with one or more public keys is stored in a one-time programmable (OTP) memory object such as, for example, a memory that includes a set of electronic fuses (e-fuses). Certain processors can be configured to program more than one public key in an OTP memory. Additionally a processor can be configured to determine which public key is to be used for authentication based on key information in a header of a signed binary data file. Traditionally, public keys related to an OTP memory is programmed at a factory to minimize likelihood of an attacker programming and/or exploiting an unused key. Additionally, one or more private keys can be encrypted and correlated to the public key that is stored in the OTP memory. In a scenario where a private key is compromised (e.g., by an untrusted source in order to gain access to a digital asset and/or to initiate an attack against the digital asset), it is desirable to revoke the public key associated with the compromised private key such that the key can no longer be used to authenticate a data file, an application, a user identifier, and/or another component of an asset system associated with the digital asset. During key revocation, it is desirable to erase the OTP memory associated with the public key identifier related to the compromised private key to prevent further access by untrusted sources. Additionally, during key revocation, a newly generated private key associated with the public key identifier can be programmed and/or the compromised private key can be erased.

In the event of a compromise of a private key, the security of a digital asset can be diluted and thus exploited for undesirable purposes. In order to overcome such scenarios, a processor can provide more than one key pair which can be employed in a situation related to compromise of a digital asset. However, to secure a digital asset, it is desirable to revoke the compromised key. Additionally, any data files, software applications, user identifiers, and/or the like associated with the digital asset can be signed with the new private key. Traditionally, hardware units associated with a digital asset and/or related asset system in need of a key revocation process are serviced at a factory location by reprogramming the OTP memory associated with the hardware units with one or more private key identifiers to ensure a compromised key becomes unusable. However, this results in decreased performance and/or increased downtime for a digital asset as the hardware units that deploy such a security measure are physically returned back to the factory location in order to perform the key revocation process and/or loading of data files signed with new, uncompromised private keys.

Thus, to address these and/or other issues, various embodiments of the present disclosure relate to computer-implemented methods, systems, apparatuses, and computer-program products directed to integrated key revocation with a field loading process and/or related safety and security checks related to an asset system. In various embodiments, safe and secure revocation of keys associated with an asset system is provided. Asset systems associated with the various embodiments of the present disclosure can include systems such as, but not limited to, avionics systems, industrial systems, industrial processing systems, industrial manufacturing systems, connected building systems, autonomous vehicle systems, enterprise systems, internet of things (IoT) systems, electronic device systems, computer systems, cybersecurity systems, navigation systems, oil and gas systems, petrochemical systems, refinery systems, procurement systems, and/or one or more other systems.

Various embodiments provide a key revocation computing system for digitally authenticating various data files and/or source code applications associated with an asset system. Additionally, various embodiments provide for determining whether a private key associated with one or more data files and/or source code applications is to be processed via a key revocation process in the event that the private key may have been or is compromised by an untrusted source. One of the many technical benefits of the various embodiments of the present disclosure is that the safe and secure revocation of the public key associated with the private key associated with the asset system can be performed at least approximately in real-time with respect to operation of the asset system and therefore greatly reduces the downtime of an asset (e.g., a digital asset) associated with the asset system. For example, if a key associated with one or more data files and/or applications comprised in a hardware unit of an avionics computing system is compromised, the avionics computing system can be digitally authenticated at least approximately in real-time with respect to operation of the avionics computing system rather than grounding the aircraft associated with the avionics computing system for an indeterminate amount of time while the hardware unit comprising the compromised keys is shipped to a factory location for key revocation and/or data loading.

Various embodiments of the present disclosure comprise a key revocation computing system comprising a cryptographic service component, an OTP memory programming component, a data-loading component, a secure key revocation component, and/or a data store configured to prevent the asset system associated with an asset from becoming unstable and/or unsecure. In various embodiments, the key revocation computing system employs a secure key revocation (SKR) application and a key revocation list (KRL) associated with various data files and software applications associated with the asset system. The key revocation computing system can direct the secure key revocation component to employ the SKR application using the data comprised within the KRL to perform key revocation. In one or more embodiments, the KRL and the OTP memory programming software library can be stored in the data store associated with the key revocation computing system. One technological benefit provided by one or more embodiments of the present disclosure is that one or more data files and/or applications associated with an asset system can be decrypted and authenticated, thus adding additional layers of security compared to conventional techniques for securing an asset.

In various embodiments, the key revocation computing system can perform secure key revocation for one or more data files whose private key has been compromised. In various embodiments, an asset system can power up in a "data load" mode and various components of the key revocation computing system can be authenticated by a "secure boot" process. As such, the secure key revocation (SKR) application can be decrypted (e.g., by the cryptographic service component) and authenticated during the secure boot process. This layer of security ensures that the SKR application itself has not been maliciously modified. If the SKR application has been successfully decrypted and authenticated during the secure boot process, an encrypted key revocation list (KRL) and the one or more data files whose private keys have been compromised are data-loaded onto a non-transitory memory component of the asset system. In various embodiments, the KRL is an electronically managed data object comprising data related to the compromised key to be revoked, and a new key with which to sign one or more data files and/or one or more software applications associated with the asset system.

In one or more embodiments, the key revocation computing system runs a series of checks to authenticate both the encrypted KRL and the one or more data files associated with the new key that have been data-loaded onto the asset system. The key revocation computing system ensures the key revocation process is indeed secure by authenticating the KRL against an OTP memory object comprising one or more public key identifiers associated with one or more private keys associated with any data files and/or software applications related to the asset system. As the KRL itself has to be signed with an authentic private key, a case might arise in which the authentication of the KRL against the OTP memory object fails, indicating that the KRL has been compromised and digitally signed with a new key, and thus the key revocation process may be unsecure. In such cases, the key revocation computing system can authenticate the KRL against the contents contained within the KRL itself. In this regard, another layer of security is introduced as the contents of the KRL are also encrypted. Therefore, to spoof a KRL, an attacker against an asset would need to both overcome the digital signature authentication of the KRL and be able to decrypt the contents of the KRL.

In one or more embodiments, after the KRL is successfully authenticated and decrypted, the key revocation computing system can decrypt and/or authenticate the compromised data file using the keys comprised in the KRL. In this way, the key revocation computing system can determine that it is indeed the data-loaded data file whose keys have been compromised and ensure that the key revocation process is secure by authenticating the data file itself and ensuring that the new key contained in the KRL is used to authenticate the data file prior to revoking the compromised key. Alternatively, if the key revocation computing system fails to decrypt the data-loaded data file, it can be determined that the data file was merely digitally signed with a new key. If the key revocation computing system determines that secure key revocation needs to be performed, the key revocation computing system ensures that at least one unrevoked key exists on the asset system. In such a case that none of the one or more data files and/or software applications on the asset system are currently using the compromised private key being revoked, then secure key revocation is performed. After the secure key revocation is performed, the KRL is invalidated as the KRL is no longer required, and a reset of the asset system is issued.

Embodiments of the present disclosure provide various technological improvements in the realm of digital security as it relates to the safety and security of various asset systems. One such technological improvement relates the ability of a user of embodiments of the present disclosure to perform secure key revocation at least approximately in real-time with respect to operation of an asset (e.g., at an airport in the case of a compromised avionics computing system), whereas conventional methods would have the user remove hardware components related to the asset system associated with the asset and ship them back to the factory for key revocation and other security services. Embodiments of the present disclosure vastly reduce the downtime an asset might experience due to a compromised key associated with a data file and/or software application related to the asset system associated with the asset. Embodiments of the present disclosure also provide the technical benefits of security and safety checks that prevent one or more components of an asset system from becoming unusable. Furthermore, embodiments of the present disclosure provide technical benefits related to a secure and safe key revocation approach with integrated data loading capabilities and procedures, thus cutting down the maintenance overhead related to the asset system and the recovery time necessary to get the corresponding assets back into service. All of these technical benefits can additionally or alternatively increase asset efficiency and/or reduce likelihood of disabled equipment.

Figure 1:
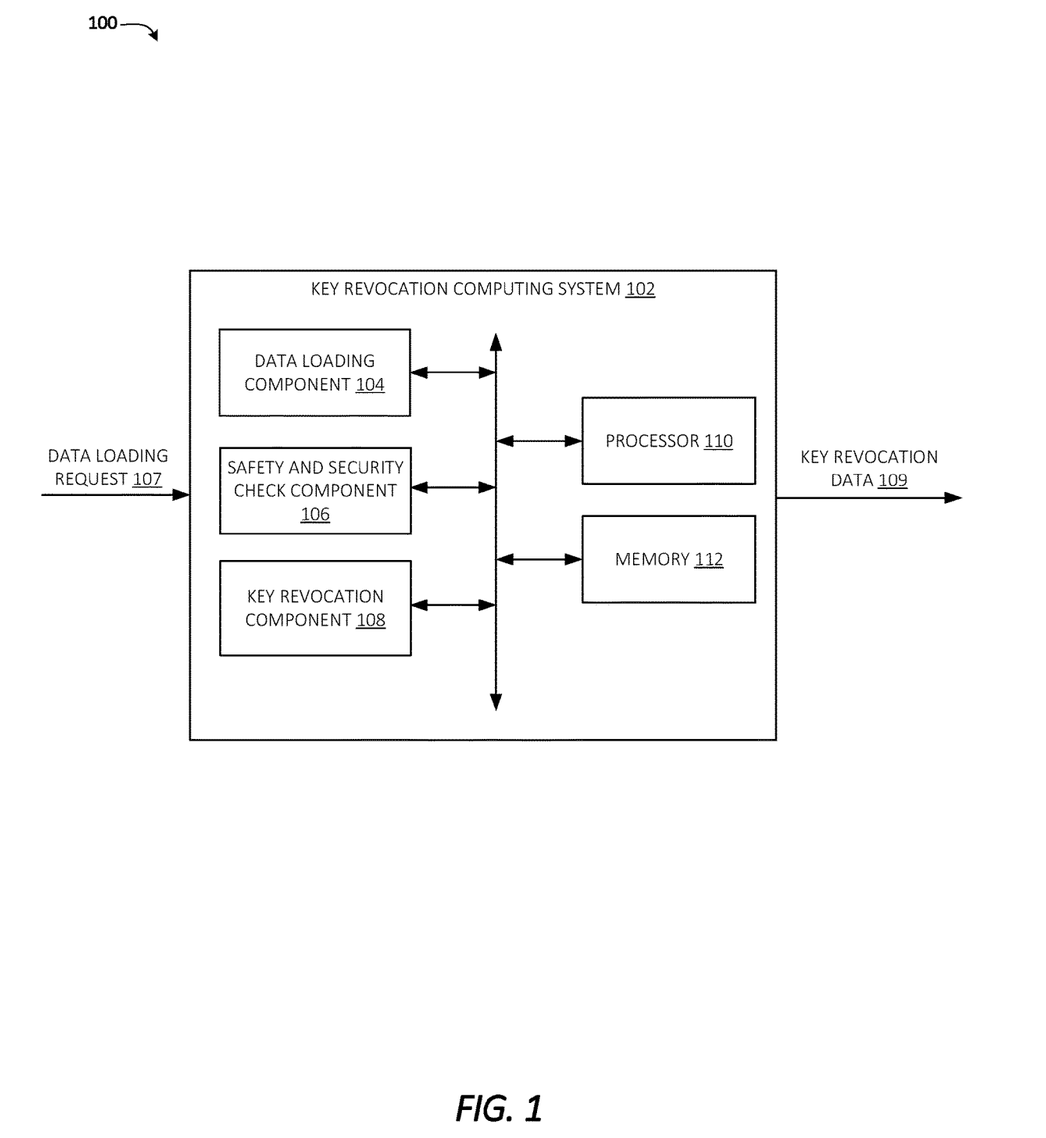
FIG. 1 illustrates a system that provides an exemplary environment, in accordance with one or more embodiments described herein.

FIG. 1 illustrates a system 100 that provides an exemplary environment according to one or more described features of one or more embodiments of the disclosure. According to an embodiment, the system 100 includes a key revocation computing system 102 to facilitate a practical application of cybersecurity, secure key revocation and/or data loading related to an asset system. In one or more embodiments, the key revocation computing system 102 facilitates a practical application of integrated key revocation with a field loading process and/or related safety and security checks related to an asset system. In one or more embodiments, the key revocation computing system 102 is integrated with an avionics system, an industrial system, an industrial processing system, an industrial manufacturing system, a connected building system, an autonomous vehicle system, an enterprise system, an IoT system, an electronic device system, a computer system, a cybersecurity system, a navigation system, an oil and gas system, a petrochemical system, a refinery system, a procurement system, and/or another type of system.

Moreover, the key revocation computing system 102 provides an improvement to one or more technologies such as cybersecurity technologies, asset vulnerability assessment technologies, industrial technologies, process plant technologies, oil and gas technologies, petrochemical technologies, refinery technologies, process plant technologies, supply chain analytics technologies, enterprise technologies, connected building technologies, industrial technologies, IoT technologies, electronic device technologies, computer technologies, aircraft technologies, navigation technologies, procurement technologies, and/or one or more other technologies. In an implementation, the key revocation computing system 102 improves performance of an asset (e.g., a digital asset). For example, in one or more embodiments, the key revocation computing system 102 improves processing efficiency of an asset, improves security for an asset, reduces downtime for an asset, reduces power consumption of an asset, and/or improves quality of data provided by an asset.

The key revocation computing system 102 includes a data loading component 104, a safety and security check component 106 and/or key revocation component 108. Additionally, in one or more embodiments, the key revocation computing system 102 includes a processor 110 and/or a memory 112. In certain embodiments, one or more aspects of the key revocation computing system 102 (and/or other systems, apparatuses and/or processes disclosed herein) constitute executable instructions embodied within a computer-readable storage medium (e.g., the memory 112). For instance, in an embodiment, the memory 112 stores computer executable component and/or executable instructions (e.g., program instructions). Furthermore, the processor 110 facilitates execution of the computer executable components and/or the executable instructions (e.g., the program instructions). In an example embodiment, the processor 110 is configured to execute instructions stored in the memory 112 or otherwise accessible to the processor 110.

The processor 110 is a hardware entity (e.g., physically embodied in circuitry) capable of performing operations according to one or more embodiments of the disclosure. Alternatively, in an embodiment where the processor 110 is embodied as an executor of software instructions, the software instructions configure the processor 110 to perform one or more algorithms and/or operations described herein in response to the software instructions being executed. In an embodiment, the processor 110 is a single core processor, a multi-core processor, multiple processors internal to the key revocation computing system 102, a remote processor (e.g., a processor implemented on a server), and/or a virtual machine. In certain embodiments, the processor 110 is in communication with the memory 112, the data loading component 104, the safety and security check component 106 and/or the key revocation component 108 via a bus to, for example, facilitate transmission of data among the processor 110, the memory 112, the data loading component 104, the safety and security check component 106 and/or the key revocation component 108. The processor 110 may be embodied in a number of different ways and, in certain embodiments, includes one or more processing devices configured to perform independently. Additionally or alternatively, in one or more embodiments, the processor 110 includes one or more processors configured in tandem via a bus to enable independent execution of instructions, pipelining of data, and/or multi-thread execution of instructions.

The memory 112 is non-transitory and includes, for example, one or more volatile memories and/or one or more non-volatile memories. In other words, in one or more embodiments, the memory 112 is an electronic storage device (e.g., a computer-readable storage medium). The memory 112 is configured to store information, data, content, one or more applications, one or more instructions, or the like, to enable the key revocation computing system 102 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In one or more embodiments, the key revocation computing system 102 (e.g., the data loading component 104 of the key revocation computing system 102) receives a data loading request 107. The data loading request 107 can be a request to store a data file via a target storage device of an asset. In various embodiments, the data file can be encrypted and/or signed with a key. In certain embodiments, the data file can be configured as code for a processor of the asset. In certain embodiments, the data file can be configured as a configuration file for the asset.

Figure 2:
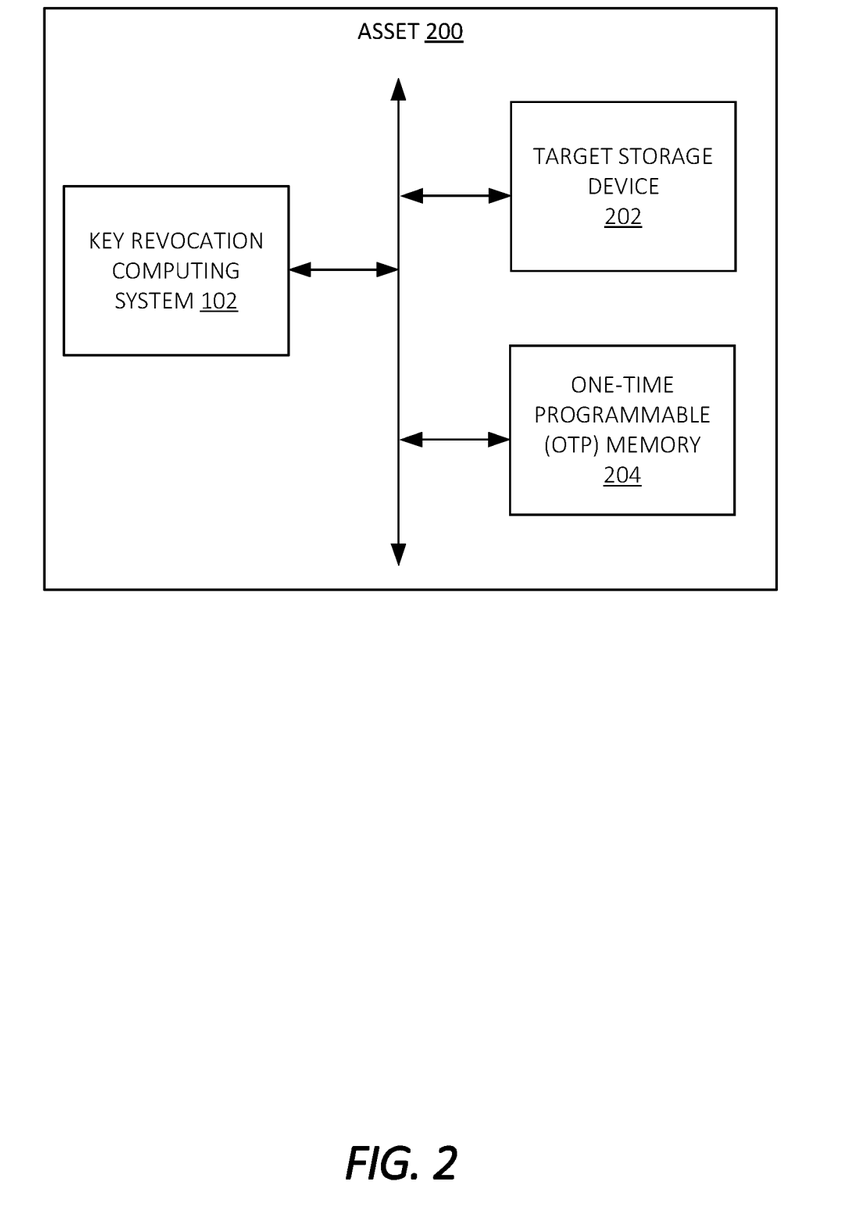
FIG. 2 illustrates an exemplary asset, in accordance with one or more embodiments described herein.

FIG. 2 illustrates an exemplary asset 200 according to one or more described features of one or more embodiments of the disclosure. For example, the asset 200 can be an asset associated with the data loading request 107. The asset 200 can be an asset such as, but not limit to, an avionic asset, a navigation asset, an industrial asset, a building asset, a vehicle asset, factory equipment, refinery equipment, and/or another type of asset. In various embodiments, the asset 200 includes and/or is in communication with a target storage device 202. For example, the data loading request 107 can be a request to store the data file via the target storage device 202. The target storage device 202 can be an electronic storage device such as a volatile memory of the asset 200, a non-volatile memory of the asset 200, a database of the asset, or another type of storage device. In various embodiments, the asset 200 additionally includes and/or is in communication with a one-time programmable (OTP) memory 204. The OTP memory 204 can be configured to store one or more hashed key identifiers associated with one or more public keys. Additionally, the OTP memory 204 can comprise a set of electronic fuses (e-fuses) associated with the one or more hashed key identifiers.

Referring back to FIG. 1, the safety and security check component 106 can be configured to perform one or more safety checks for the asset 200. In various embodiments, in response to the data loading request 107, the safety and security check component 106 can compare a key identifier for the first key associated with a data file against a list of key identifiers stored in a key revocation list (KRL) in order to authenticate the data file. In various embodiments, the KRL can be an encrypted KRL. Additionally, the safety and security check component 106 can compare the key identifier for the first key associated with the data file against and the OTP memory 204 of the asset 200. In various embodiments, the safety and security check component 106 can compare the key identifier for the first key against the list of key identifiers in response to a determination that the KRL is authenticated against the OTP memory 204. In various embodiments, the data loading component 104 can receive the data loading request 107 in response to a determination that a secure key revocation (SKR) application associated with the key revocation list is successfully authenticated.

In one or more embodiments, the safety and security check component 106 can determine that no key revocation process will be performed on the asset 200 based on a set of pre-defined conditions. In various embodiments, the pre-defined conditions can include, but are not limited to, a determination that the decryption and/or authentication of the SKR application fails during the secure boot process, a determination that the decryption and/or authentication of the KRL by the SKR application fails, a determination that the data-loaded data file cannot be authenticated by the SKR application, a determination that no unrevoked keys exist on the asset 200, and/or a determination that data files on the asset 200 are using the keys that are being revoked by the key revocation component 108.

Additionally and/or alternatively, in various embodiments, the safety and security check component 106 can work in conjunction with the key revocation component 108 to determine if a particular key being revoked is the key with which the SKR application itself is digitally signed. In such cases, the key revocation component 108 can determine that the SKR application signed with that particular key is available on the asset 200, and the key revocation component 108 can authenticate the SKR application against the KRL to determine if the SKR application has been compromised. Similarly, in one or more embodiments, the safety and security check component 106 can work in conjunction with the key revocation component 108 to determine if a particular key being revoked is the key with which KRL itself is digitally signed. In such cases, the key revocation component 108 can determine if the KRL signed with that particular key is available on the asset 200 and can authenticate the KRL against KRL itself. When the KRL is signed with a new key, there must be a data file digitally signed with same new key specified in the KRL and the data file must be data-loaded on the asset 200. If said data file is not data-loaded on the asset 200, then no key revocation is performed.

The key revocation component 108 can be configured to perform a key revocation process in response to successful authentication provided by the safety and security check component 106. In response to a determination that the data file is successfully authenticated against the key revocation list and the OTP memory 204, the key revocation component 108 can perform a key revocation process with respect to a second key for the data file associated with the data loading request 107. In various embodiments, the second key can be mapped to an electronic fuse of the OTP memory 204. In various embodiments, key revocation component 108 can determine the second key based on a revoked key identified in the key revocation list. In various embodiments, the key revocation component 108 can perform the key revocation process with respect to the second key in response to a determination that one or more files previously stored on the target storage device 202 do not employ the second key.

In various embodiments, the key revocation component 108 can additionally or alternatively invalidate the key revocation list upon successful key revocation. For example, the key revocation component 108 can invalidate the key revocation list in response the key revocation process. Additionally or alternatively, the key revocation component 108 can invalidate the key revocation list in response to the determination that the data file is successfully authenticated against the key revocation list and the OTP memory 204. In various embodiments, the key revocation component 108 can additionally or alternatively reset a processor of the asset upon successful key revocation. For example, the key revocation component 108 can reset the processor of the asset upon successful key revocation (e.g., in response to the determination that the data file is successfully authenticated against the key revocation list and the OTP memory 204). The processor can be the processor 110 or another processor of the asset 200. In various embodiments, the key revocation component 108 can generate key revocation data 109 that identifies the second key, provides a control command to perform the key revocation process, provides a control command to invalidate the key revocation list, provides a control command to reset the processor, and/or provides other information to facilitate the key revocation process.

Figure 3:
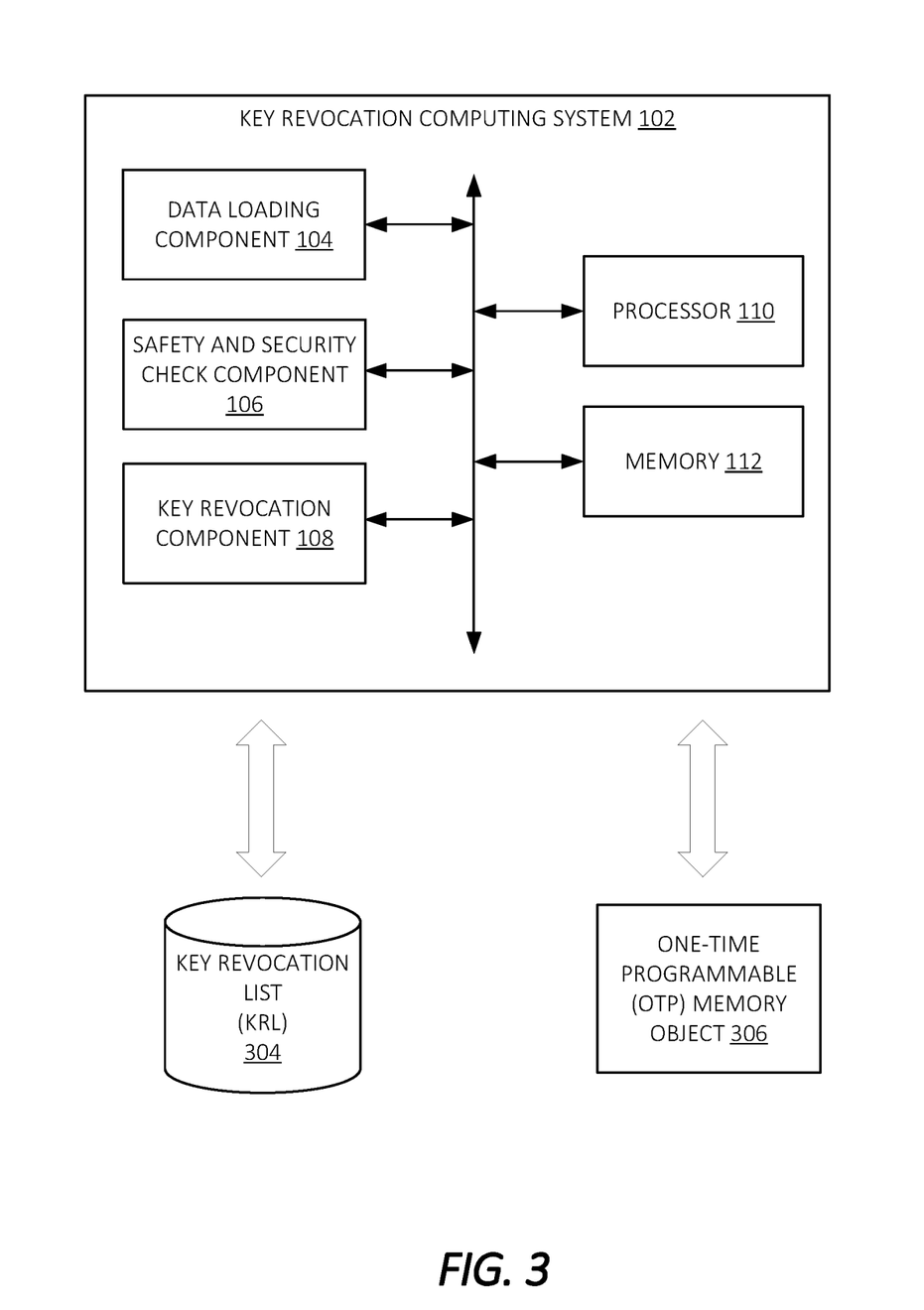
FIG. 3 illustrates a data diagram for safely and securely revoking keys in an asset system, in accordance with one or more embodiments described herein.

FIG. 3 illustrates a data diagram 300 for safely and securely revoking keys in an asset system, in accordance with one or more embodiments described herein. In particular, data flow diagram 300 illustrates a data flow between major components of various embodiments of the present disclosure, namely the key revocation computing system 102, a key revocation list (KRL) 304, and a one-time programmable (OTP) memory object 306. In one or more embodiments, a secure key revocation (SKR) application can be stored and/or executed by the key revocation computing system 102. In various embodiments, the SKR application can be stored in the memory 112. In one or more embodiments, the SKR application can be encrypted to protect it from being spoofed and ensure confidentiality. Additionally, the SKR application can be digitally signed with a private key such that the identity of the SKR application can be authenticated to ensure that it hasn't been maliciously altered in any way. In various embodiments, the OTP memory object 306 can be an OTP memory object of the OTP memory 204.

In one or more embodiments, the key revocation computing system 102 is configured to execute one or more operations related to the safe and secure revocation of keys associated with one or more data files and/or one or more applications associated with an asset system. Such operations include, but are not limited to, authenticating a key revocation list (e.g., KRL 304), decrypting a key revocation list (such as KRL 304), authenticating one or more data files and/or applications associated with an asset system, decrypting one or more data files and/or applications associated with the asset 200, as well as safely and securely revoking one or more keys associated with the asset 200. For these and other purposes, in one or more embodiments, the key revocation computing system 102 comprises various cryptographic services and sub-applications as well as an OTP memory programming software library.

In one or more embodiments, the key revocation computing system 102 employs the KRL 304 to safely and securely revoke keys associated with the asset 200. In various embodiments, the KRL 304 is an electronically managed data object comprising data related to a compromised key to be revoked, and a new key with which to sign one or more data files and/or one or more software applications associated with the asset 200 after the secure key revocation process has been performed. In one or more embodiments, the KRL 304 can be encrypted to protect it from being spoofed. Additionally, the contents of the KRL 304 related to the potentially compromised key and the new key can also be encrypted, thus adding an additional layer of security to embodiments of the present disclosure. Furthermore, the KRL 304 can be digitally signed with a key such that the identity of the KRL 304 can be authenticated to ensure it hasn't been maliciously altered in any way In one or more embodiments, the KRL 304 can be stored in a server system associated with an enterprise employing an embodiment of the present disclosure and transmitted via a communications network to the asset 200. This off-site storage of the KRL 304 adds yet another layer of security to embodiments of the present disclosure. Additionally or alternatively, the KRL 304 can be stored in non-transitory memory associated with the asset 200 and accessed by the key revocation computing system 102 as necessary during a secure key revocation process, thus adding flexibility to various embodiments of the present disclosure.

In one or more embodiments, the OTP memory object 306 is a one-time programmable, electronically managed data object comprising one or more keys associated with the asset 200. The key revocation computing system 102 can utilize the one or more keys comprised in the OTP memory object 306 to authenticate various components of the asset system. For instance, the key revocation computing system 102 can utilize the keys comprised in the OTP memory object 306 to authenticate one or more data files and/or one or more software applications associated with the asset 200. Furthermore, the key revocation computing system 102 can utilize the keys comprised in the OTP memory object 306 to authenticate the KRL 304 before performing a secure key revocation process. In one or more embodiments, the OTP memory object 306 can be digitally signed and the digital signature can be authenticated by key revocation computing system 102 as a last safety check to ensure there is no backdoor entry into the key revocation computing system 102 and/or the asset 200. In the case that a key comprised in the OTP memory object 306 associated with the asset 200 has indeed been compromised by an attacker, the SKR application can erase, alter, and/or otherwise manipulate the OTP memory object 306 such that the compromised key is "revoked" and can no longer be used to authenticate and/or decrypt any data files and/or software applications associated with the asset 200.

Figure 4A:
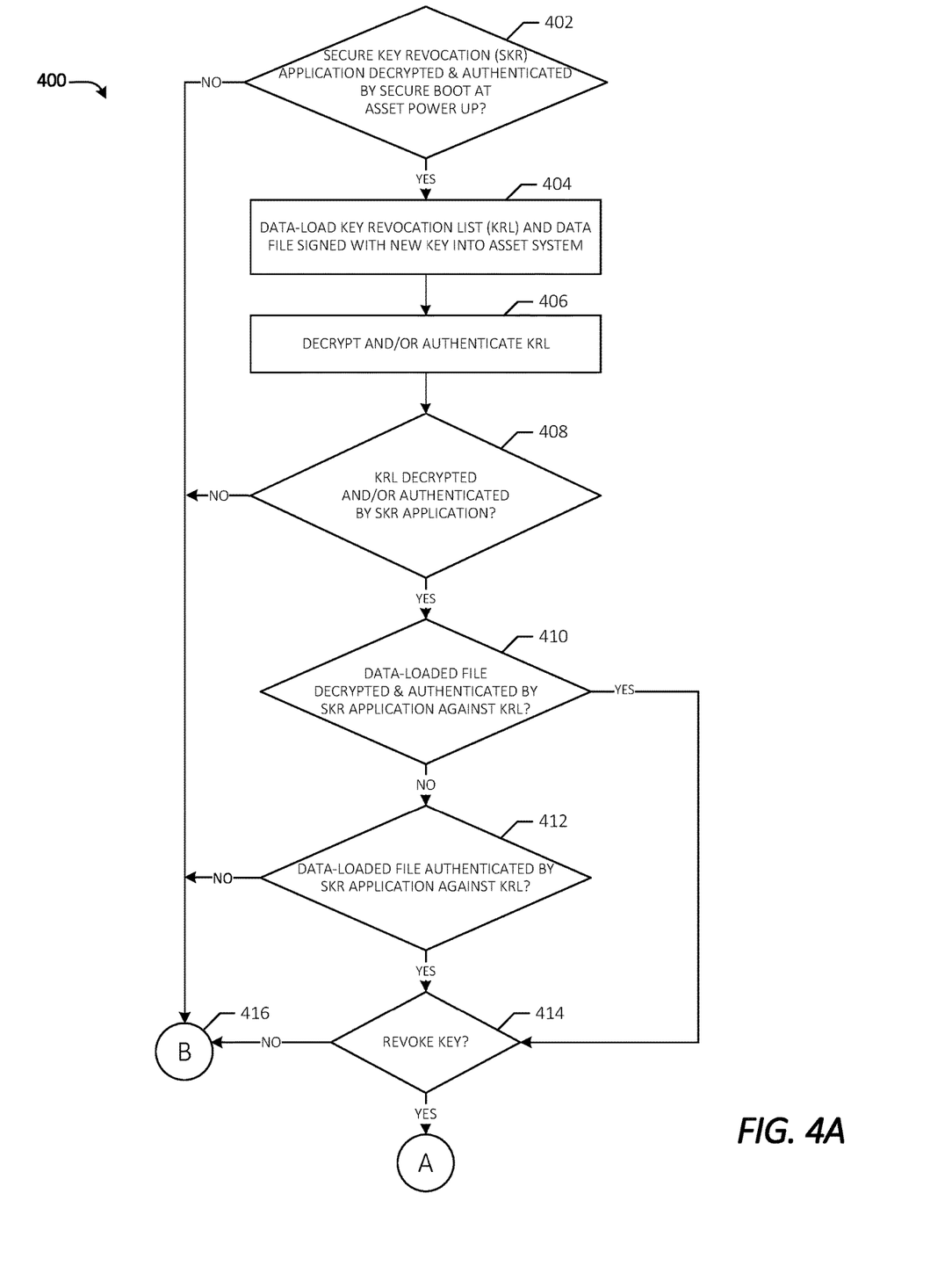
FIGS. 4A and 4B illustrate a process flow diagram for safely and securely revoking keys in an asset system, in accordance with one or more embodiments described herein.
Figure 4B:
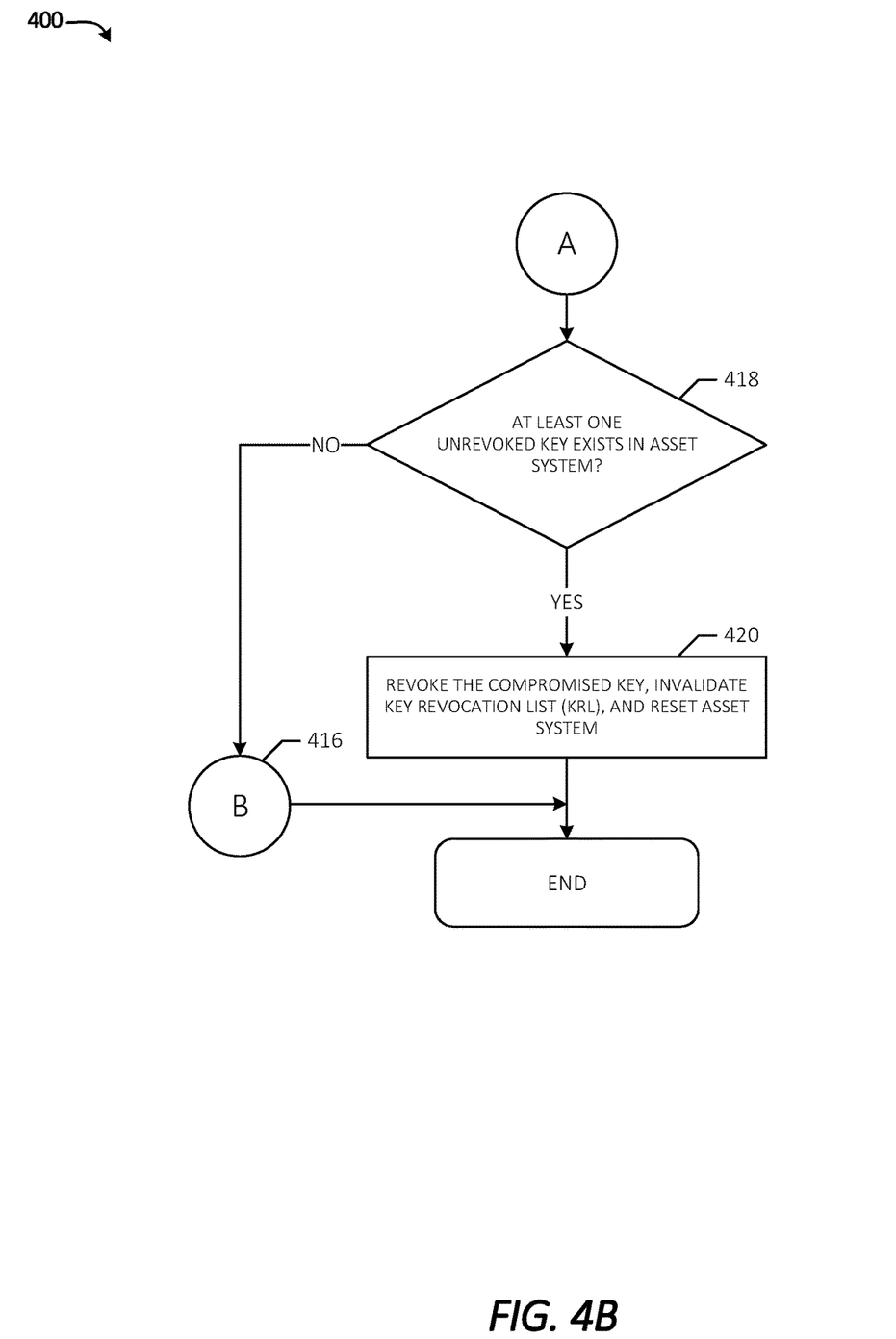

FIGS. 4A and 4B illustrate a process flow diagram 400 for safely and securely revoking keys in the asset 200, in accordance with one or more embodiments described herein. Specifically, FIGS. 4A and 4B illustrate a process 400 for secure key revocation by authenticating and decrypting various components of the asset 200, and determining whether a key associated with the asset 200 is compromised and a key revocation is to be executed.

In one or more embodiments, the method 400 is associated with the key revocation computing system 102. The process 400 begins at step 402 that determines if a secure key revocation (SKR) application has been authenticated and optionally decrypted successfully during a "secure boot" at power up the asset 200. In various embodiments, the asset 200 can power up in a "data load" mode and various components of the asset 200 can be authenticated by a secure boot process. In various embodiments, the SKR application can be optionally decrypted and authenticated during the secure boot process. This layer of security ensures that the SKR application itself has not been maliciously modified. In the case that the SKR application cannot be authenticated and/or decrypted, the process 400 proceeds to step 416 which terminates the secure key revocation process.

If the SKR application is successfully authenticated and optionally decrypted during the secure boot process at step 402, the process 400 proceeds to step 404. At step 404, a key revocation list (KRL) (e.g., KRL 304) and the one or more data files that have been signed with a new key are data-loaded (e.g., by the data loading component 104) onto a non-transitory memory component of the asset 200. In one or more embodiments, the KRL 304 can be encrypted. Once the pertinent data files and KRL 304 have been data loaded into the asset 200, the process 400 proceeds to step 406. At step 406, the safety and security check component 106 can use the data related to the keys associated with the asset 200 in the OTP memory object 306 to decrypt and/or authenticate the KRL 304. The safety and security check component 106 ensures the key revocation process is indeed secure by authenticating the KRL 304 against the OTP memory object 306.

At step 408 the safety and security check component 106 determines if the KRL 304 has been successfully authenticated and/or decrypted. As the KRL 304 itself has to be signed with an authentic key, a case might arise in which the authentication of the KRL 304 against the OTP memory object 306 fails, indicating that the KRL 304 has been compromised and digitally signed with a new key, and thus the key revocation process may be unsecure. In this regard, another layer of security is introduced as the contents of the KRL 304 are also encrypted. Therefore, to spoof a KRL 304, an attacker would need to both overcome the digital signature authentication of the KRL 304 and be able to decrypt the contents of the KRL 304. If the safety and security check component 106 has not successfully authenticated and decrypted the KRL 304, the process 400 proceeds to step 416 which terminates the secure key revocation process. If the safety and security check component 106 has successfully authenticated and/or decrypted the KRL, the process 400 proceeds to step 410.

At step 410 the safety and security check component 106 determines if the one or more data files with potentially compromised keys data-loaded onto the asset 200 at step 404 can be authenticated and decrypted. In one or more embodiments, after the KRL 304 is successfully authenticated and decrypted, the safety and security check component 106 can authenticate and decrypt the data files signed with the new key using the keys comprised the KRL 304. In this way, the safety and security check component 106 can determine that it is indeed the data-loaded data file whose keys have been compromised and ensure that the key revocation process is secure by authenticating the data file itself and ensuring that the new key comprised in the KRL 304 is used to sign the data file prior to revoking the compromised key. If the safety and security check component 106 can successfully authenticate and decrypt the data files associated with the potentially compromised keys using the keys comprised the KRL 304, the process 400 proceeds to step 414. If the safety and security check component 106 cannot authenticate and decrypt the potentially compromised data files using the keys comprised the KRL 304, the process 400 proceeds to step 412.

At step 412 the safety and security check component 106 can attempt to authenticate the data-loaded data files even if the safety and security check component 106 was unsuccessful in decrypting the data-loaded data files. In various embodiments, if the safety and security check component 106 fails to decrypt the data-loaded data files with the compromised key comprised in the KRL 304, it can still attempt to authenticate the data-loaded data files using the KRL 304. In such cases, it may be determined that the data file was merely digitally signed with a new key. However, if the safety and security check component 106 cannot authenticate the data-loaded data files against the KRL 304, the process 400 proceeds to step 416 which terminates the secure key revocation process.

At step 414, the key revocation component 108 can determine if a key needs to be revoked. In the event that the key revocation component 108 determines that the potentially compromised key associated with the data-loaded data file does not need to be revoked, the process 400 proceeds to step 416 which terminates the secure key revocation process. However, if the key revocation component 108 determines that the potentially compromised key associated with the data-loaded data file does need to be revoked, the process 400 enters the final steps starting at step 418 which comprise safety checks to ensure that revoking the potentially compromised key will not destabilize the asset 200 and/or render the asset 200 unusable.

At step 418, the key revocation component 108 determines that at least one unrevoked key exists on the asset 200. In one or more embodiments, the OTP memory object 306 associated with the asset 200 comprises one or more keys with which it can sign data files and/or software applications. However, in some cases, one or more keys comprised in the OTP memory object 306 may have been revoked during prior secure key revocations processes. Alternatively, in some embodiments, the whole OTP memory object 306 can be revoked such that all of the keys comprised within the OTP memory object 306 are invalidated. In such cases that there are no unrevoked keys available for the associated asset 200, the process 400 proceeds to step 416 which terminates the secure key revocation process. Alternatively, if the key revocation component 108 determines there is at least one key available on the asset 200, the process 400 proceeds to step 420.

At step 420, the key revocation component 108 revokes the compromised key associated with the data-loaded data file. When secure key revocation is performed on the compromised key, the KRL 304 is invalidated and destroyed as it is no longer required. During key revocation, the OTP memory object 306 associated with the compromised key can be erased and/or updated to prevent any further exploitation by an attacker. In some embodiments, one or more keys comprised in the OTP memory object 306 can be erased, altered, and/or otherwise flagged such that they can no longer be used to digitally sign data files and/or software applications associated with the asset 200. Alternatively, in some embodiments, the whole OTP memory object 306 can be erased, altered, and/or otherwise flagged such that all of the keys comprised within the OTP memory object 306 are invalidated and can no longer be used to digitally sign data files and/or applications associated with the asset 200. Upon successful revocation of the compromised key a reset of the asset 200 is issued.

Figure 5:
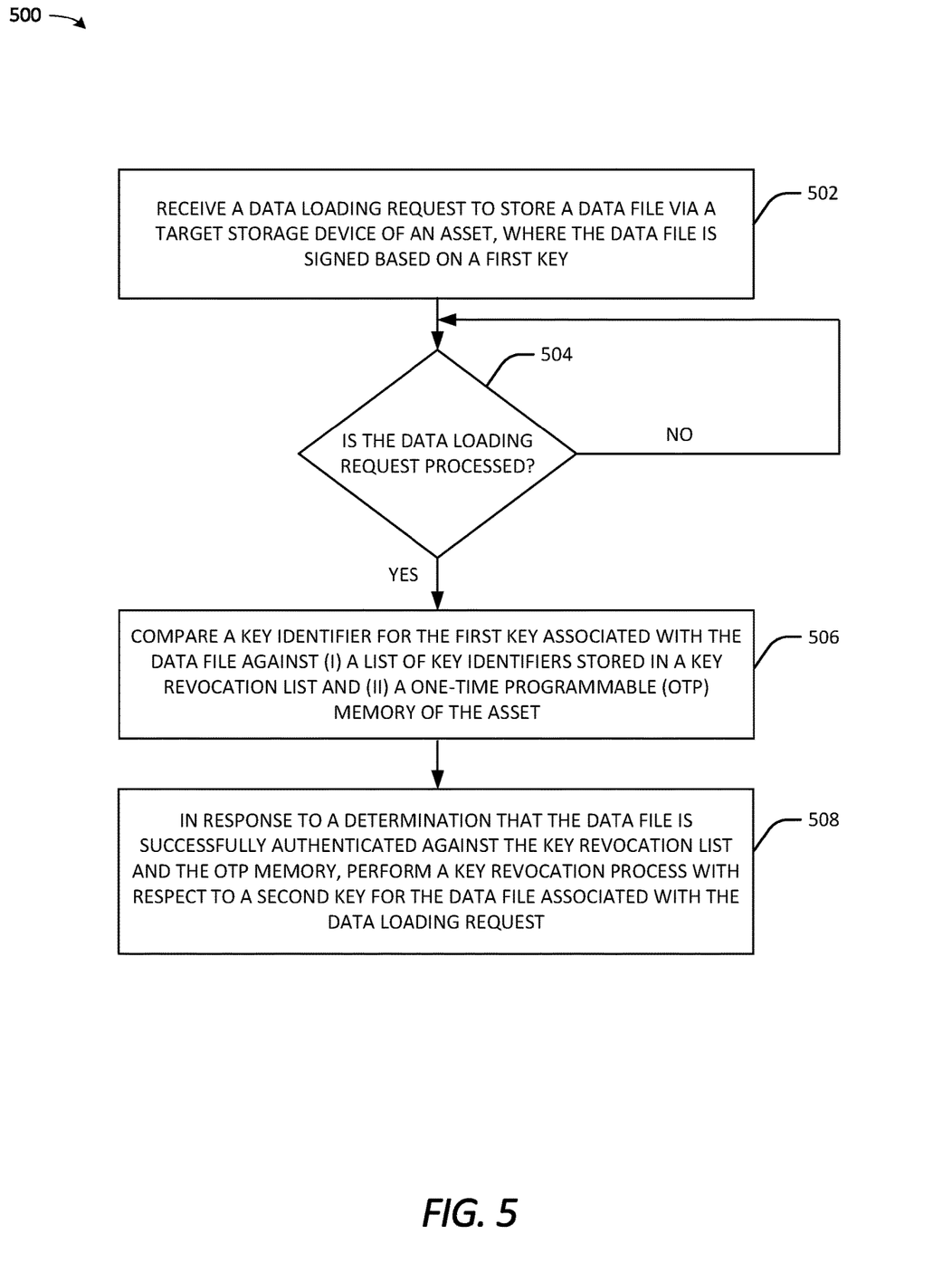
FIG. 5 illustrates a flow diagram for providing integrated key revocation with a field loading process and/or related safety checks related to an asset system, in accordance with one or more embodiments described herein.

FIG. 5 illustrates a method 500 for providing integrated key revocation with a field loading process and/or related safety checks related to an asset system, in accordance with one or more embodiments described herein. The method 500 is associated with the key revocation computing system 102, for example. For instance, in one or more embodiments, the method 500 is executed at a device (e.g., the key revocation computing system 102) with one or more processors and a memory. In one or more embodiments, the method 500 begins at block 502 that receives (e.g., by the data loading component 104) a data loading request to store a data file via a target storage device of an asset, where the data file is signed based on a first key. The data file can be signed based on the first key via one or more cryptographic processes to create a digital signature for the data file. In certain embodiments, the data file can be signed via one or more hashing techniques associated with the first key. In certain embodiments, the data file can be encrypted based on the first key.

At block 504, it is determined whether the data loading request is processed. If no, block 504 is repeated to determine whether the request is processed. If yes, the method 500 proceeds to block 506. In response to the data loading request, block 506 compares (e.g., using the safety and security check component 106) a key identifier for the first key associated with the data file against (i) a list of key identifiers stored in a key revocation list and (ii) a one-time programmable (OTP) memory of the asset.

Additionally, in response to the data loading request, the method 500 also includes a block 508 that, in response to a determination that the data file is successfully authenticated against the key revocation list and the OTP memory, performs (e.g., using the key revocation component 108) a key revocation process with respect to a second key for the data file associated with the data loading request.

Figure 6:
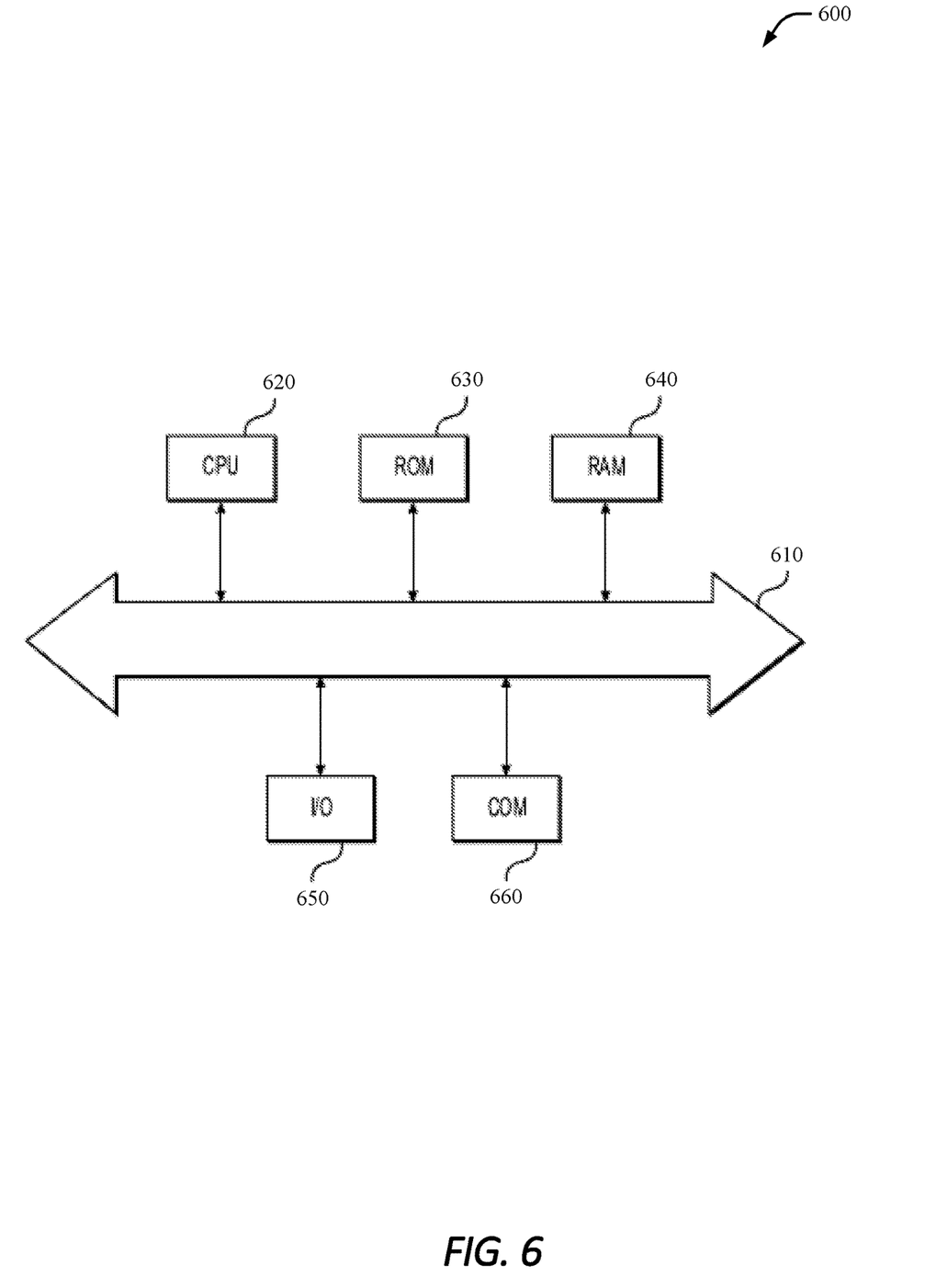
FIG. 6 illustrates a functional block diagram of a computer that may be configured to execute techniques described in accordance with one or more embodiments described herein.

FIG. 6 depicts an example system 600 that may execute techniques presented herein. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 660 for packet data communication. The platform also may include a central processing unit ("CPU") 620, in the form of one or more processors, for executing program instructions. The platform may include an internal communication bus 610, and the platform also may include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™ or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
   one or more processors;
   a memory; and
   one or more programs stored in the memory, the one or more programs comprising instructions configured to:
      receive a data loading request to store a data file via a target storage device of an asset, wherein the data file is signed based on a first key; and
      in response to the data loading request:
         compare a key identifier for the first key associated with the data file against (i) a list of key identifiers stored in a key revocation list and (ii) a one-time programmable (OTP) memory of the asset; and
         in response to a determination that the data file is successfully authenticated against the key revocation list and the OTP memory,
            perform a key revocation process with respect to a second key for the data file associated with the data loading request; and
            initiate a control command to invalidate the list of key identifiers stored in the key revocation list.

2. The system of claim 1, the one or more programs further comprising instructions configured to:
   determine the second key based on a revoked key identified in the key revocation list.

3. The system of claim 1, wherein the second key is mapped to an electronic fuse of the OTP memory.

4. The system of claim 1, the one or more programs further comprising instructions configured to:
   compare the key identifier for the first key against the list of key identifiers in response to a determination that the key revocation list is authenticated.

5. The system of claim 1, the one or more programs further comprising instructions configured to:
   receive the data loading request in response to a determination that a secure key revocation application associated with the key revocation list is successfully authenticated.

6. The system of claim 1, the one or more programs further comprising instructions configured to:
   reset a processor of the asset upon successful key revocation.

7. The system of claim 1, wherein the data file is configured as source code for a processor of the asset.

8. The system of claim 1, wherein the data file is configured as a configuration file for the asset.

9. A computer-implemented method, the method comprising:
   receiving a data loading request to store a data file via a target storage device of an asset, wherein the data file is signed based on a first key; and
   in response to the data loading request:
      comparing a key identifier for the first key associated with the data file against (i) a list of key identifiers stored in a key revocation list and (ii) a one-time programmable (OTP) memory of the asset; and
      in response to a determination that the data file is successfully authenticated against the key revocation list and the OTP memory,
         performing a key revocation process with respect to a second key for the data file associated with the data loading request; and
         initiating a control command to invalidate the list of key identifiers stored in the key revocation list.

10. The computer-implemented method of claim 9, further comprising:
    determining the second key based on a revoked key identified in the key revocation list.

11. The computer-implemented method of claim 9, further comprising:
    comparing the key identifier for the first key against the list of key identifiers in response to a determination that the key revocation list is authenticated.

12. The computer-implemented method of claim 9, further comprising:

receiving the data loading request in response to a determination that a secure key revocation application associated with the key revocation list is successfully authenticated.

13. The computer-implemented method of claim 9, further comprising:
resetting a processor of the asset upon successful key revocation.

14. A computer program product comprising at least one computer-readable storage medium having program instructions embodied thereon, the program instructions executable by a processor to cause the processor to:
receive a data loading request to store a data file via a target storage device of an asset, wherein the data file is signed based on a first key; and
in response to the data loading request:
compare a key identifier for the first key associated with the data file against (i) a list of key identifiers stored in a key revocation list and (ii) a one-time programmable (OTP) memory of the asset; and
in response to a determination that the data file is successfully authenticated against the key revocation list and the OTP memory,
perform a key revocation process with respect to a second key for the data file associated with the data loading request; and
initiate a control command to invalidate the list of key identifiers stored in the key revocation list.

15. The computer program product of claim 14, wherein the program instructions further cause the processor to:
compare the key identifier for the first key against the list of key identifiers in response to a determination that the key revocation list is authenticated.

16. The computer program product of claim 14, wherein the program instructions further cause the processor to:
receive the data loading request in response to a determination that a secure key revocation application associated with the key revocation list is successfully authenticated.

17. The computer program product of claim 14, wherein the program instructions further cause the processor to:
reset a processor of the asset upon successful key revocation.

18. The system of claim 1, the one or more programs further comprising instructions configured to:
identify the second key based on a revoked key included in the key revocation list.

19. The computer-implemented method of claim 9, further comprising:
identifying the second key based on a revoked key included in the key revocation list.

20. The computer program product of claim 14, wherein the program instructions further cause the processor to:
identify the second key based on a revoked key included in the key revocation list.

* * * * *